(12) United States Patent
Kim et al.

(10) Patent No.: US 9,236,630 B2
(45) Date of Patent: Jan. 12, 2016

(54) SECONDARY BATTERY COMPRISING INSULATOR AND REINFORCING FILLER

(71) Applicant: LG CHEM, LTD., Seoul (KR)

(72) Inventors: Do Gyun Kim, Cheongwon-gun (KR); Dong-Myung Kim, Daejeon (KR); Dong Sub Lee, Icheon-si (KR); Sang Bong Nam, Cheonan-si (KR); Sang Sok Jung, Cheonan-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/177,631

(22) Filed: Feb. 11, 2014

(65) Prior Publication Data

US 2014/0178725 A1 Jun. 26, 2014

Related U.S. Application Data

(63) Continuation of application No. PCT/KR2012/007434, filed on Sep. 18, 2012.

(30) Foreign Application Priority Data

Sep. 27, 2011 (KR) .................. 10-2011-0097269

(51) Int. Cl.
*H01M 10/02* (2006.01)
*H01M 10/04* (2006.01)
*H01M 10/052* (2010.01)
*H01M 2/36* (2006.01)
*H01M 10/0587* (2010.01)
(Continued)

(52) U.S. Cl.
CPC ............ *H01M 10/0431* (2013.01); *H01M 2/36* (2013.01); *H01M 10/052* (2013.01); *H01M 10/0587* (2013.01); *H01M 2/022* (2013.01); *H01M 2/06* (2013.01); *Y02E 60/122* (2013.01); *Y02T 10/7011* (2013.01)

(58) Field of Classification Search
CPC ....... H01M 2/02; H01M 2/022; H01M 2/027; H01M 2/0408; H01M 10/04
See application file for complete search history.

(56) References Cited

U.S. PATENT DOCUMENTS

| 6,797,429 | B1 | 9/2004 | Komatsu |
| 7,722,983 | B2 | 5/2010 | Kim |
| 2003/0198863 | A1* | 10/2003 | Murashige et al. ............. 429/53 |

(Continued)

FOREIGN PATENT DOCUMENTS

| CN | 1992422 A | 7/2007 |
| CN | 1288594 A | 3/2011 |

(Continued)

OTHER PUBLICATIONS

International Search Report, issued in PCT/KR2012/007434, dated, Feb. 7, 2013.

(Continued)

*Primary Examiner* — Kenneth Douyette
(74) *Attorney, Agent, or Firm* — Birch, Stewart, Kolasch & Birch, LLP

(57) ABSTRACT

Disclosed is a secondary battery having a structure in which a jelly-roll having a cathode/separator/anode structure is mounted in a cylindrical battery case and a plate-shaped insulator is mounted on top of the jelly-roll, wherein the insulator has a porous structure in which a plurality of fine pores communicate in a longitudinal direction, or in traverse and longitudinal directions.

10 Claims, 3 Drawing Sheets

(51) Int. Cl.
H01M 2/02 (2006.01)
H01M 2/06 (2006.01)

(56) References Cited

U.S. PATENT DOCUMENTS

| 2006/0068278 A1* | 3/2006 | Bloom et al. | 429/176 |
| 2007/0154789 A1 | 7/2007 | Chang et al. | |
| 2010/0055555 A1 | 3/2010 | Fukase et al. | |
| 2010/0215996 A1* | 8/2010 | Wendling et al. | 429/54 |

FOREIGN PATENT DOCUMENTS

| CN | 102013460 A | 4/2011 |
| EP | 1 049 180 A1 | 11/2000 |
| EP | 1 804 327 A1 | 7/2007 |
| JP | 2000-348771 A | 12/2000 |
| JP | 2002-231314 A | 8/2002 |
| JP | 2005-285514 A | 10/2005 |
| JP | 2010-192438 A | 10/2005 |
| JP | 2010-061815 A | 3/2010 |
| JP | 2010-61815 A | 3/2010 |
| JP | 2010-170770 A | 8/2010 |
| KR | 10-2007-0071244 A | 7/2007 |
| KR | 10-2008-0030702 A | 4/2008 |

OTHER PUBLICATIONS

5 Chinese Office Action with English language translation dated Jul. 24, 2015.
Chinese Office Action and Search Report dated Sep. 17, 2015, for Chinese Application No. 201280042038.4 with the English translation.

* cited by examiner

SECONDARY BATTERY COMPRISING INSULATOR AND REINFORCING FILLER

CROSS REFERENCE TO RELATED APPLICATIONS

This application is a Bypass Continuation of PCT International Application No. PCT/KR2012/007434 filed on Sep. 18, 2012, which claims priority under 35 U.S.C. §119(a) to Patent Application No. 10-2011-0097269 filed in the Republic of Korea on Sep. 27, 2011, all of which are hereby expressly incorporated by reference into the present application.

TECHNICAL FIELD

The present invention relates to a secondary battery with superior productivity and safety. More specifically, the present invention relates to a secondary battery having a structure in which a jelly-roll having a cathode/separator/anode structure is mounted in a cylindrical battery case and a plate-shaped insulator is mounted on top of the jelly-roll, wherein the insulator has a porous structure in which a plurality of fine pores communicate in a longitudinal direction, or in traverse and longitudinal directions.

BACKGROUND ART

The development of techniques associated with mobile devices and increase in demand therefor have brought about rapid increase in the demand for secondary batteries as energy sources. Among secondary batteries, lithium secondary batteries with high energy density, high driving voltage and superior storage and lifespan characteristics are widely used as energy sources of various electric products including mobile devices.

Depending on the shape of the battery case, the secondary battery may be divided into cylindrical and rectangular batteries mounted in cylindrical and rectangular metal cans, respectively, and a pouch-shaped battery mounted in a pouch-shaped case made of an aluminum laminate sheet. Of these, the cylindrical battery has advantages of relatively high capacity and superior structural stability. The electrode assembly mounted in the battery case is an electricity-generating device enabling charge and discharge that has a cathode/separator/anode laminate structure and is divided into a jelly-roll type in which an electrode assembly including a separator interposed between a cathode and an anode, each made of an active material-coated long sheet, is rolled, a stack-type in which a plurality of cathodes and a plurality of anodes are laminated in this order such that a separator is interposed between the cathode and the anode and a stack/folding type which is a combination of a jelly-roll type and a stack type. Of these, the jelly-roll-type electrode assembly has advantages of easy manufacture and high energy density per unit weight.

In this regard, a conventional cylindrical secondary battery is shown in FIG. 1. An insulator generally used for the cylindrical secondary battery is shown in plan views of FIGS. 2 and 3.

Referring to FIGS. 2 and 3, a cylindrical secondary battery 100 is manufactured by mounting a jelly-roll type (rolled-type) electrode assembly 120 in a battery case 130, injecting an electrolyte into the battery case 130 and coupling a cap assembly 140 provided with an electrode terminal (for example, a cathode terminal; not shown) to the open top of the case 130.

The electrode assembly 120 is obtained by inserting a separator 123 between a cathode 121 and an anode 122, and rolling the resulting structure into a round shape. A cylindrical center pin 150 is inserted into the core (center) of the jelly-roll. The center pin 150 is generally made of a metal to impart a predetermined strength and has a hollow-shaped cylindrical structure of a roundly bent plate material. Such a center pin 150 sets and supports the electrode assembly and serves as a passage, enabling discharge of gas generated by internal reaction during charge and discharge, and operation.

In addition, a plate-shaped insulator 180a is mounted on top of the electrode assembly 120, and is provided in the center thereof with an opening 181a communicating with the through hole 151 of the center pin 150 so that gas is discharged and the cathode tap 142 of the electrode assembly 120 is connected to the cap plate 145 of the cap assembly 140.

However, the insulator 180a arranged on top of the jelly-roll is a structure that blocks a passage, enabling permeation of electrolyte into a battery in the process of injecting the electrolyte into the battery. For this reason, the electrolyte permeates the battery only through the opening 181a communicating with the center pin 150 and a region excluding the insulator 180a, thus disadvantageously requiring a long time for injection of electrolyte and consequently causing deterioration in productivity.

In order to improve permeability of the electrolyte, as shown in FIG. 3, a partial connection member 180b having a structure in which a plurality of through pores 182b are formed around an opening 181b is suggested.

However, this structure is found to have serious problems in terms of safety. That is, conductive impurity particles such as metal powders generated in the process of manufacturing and/or assembling the cap assembly 140, the battery case 130 and the like are permeated into the electrode assembly 120 through the through pores 182b that are perforated in the insulator 180b, thus disadvantageously causing occurrence of short circuit or deterioration in battery lifespan.

Accordingly, there is an increasing need for secondary batteries that enhance injection processability of electrolyte and prevent incorporation of foreign matter in the process of assembling batteries, thereby improving lifespan.

DISCLOSURE

Technical Problem

Therefore, the present invention has been made to solve the above and other technical problems that have yet to be resolved.

As a result of a variety of extensive and intensive studies and experiments to solve the problems as described above, the present inventors developed an insulator having a specific shape described below and discovered that the insulator considerably enhances injectability of electrolyte, prevents, in the jelly-roll, incorporation of foreign matter produced during an assembly process such as beading, and thereby prevents battery defects and improves safety. The present invention has been completed, based on this discovery.

Technical Solution

In accordance with one aspect of the present invention, provided is a secondary battery having a structure in which a jelly-roll having a cathode/separator/anode structure is mounted in a cylindrical battery case and a plate-shaped insulator is mounted on top of the jelly-roll, wherein the insulator has a porous structure in which a plurality of fine pores communicate in a longitudinal direction, or in traverse and longitudinal directions. Accordingly, in the secondary battery according to the present invention, an electrolyte is injected through a plurality of fine pores having a specific shape and, as a result, injection time can be shortened and injectability is thus improved.

In the porous structure, size, position and number of the fine pores and distance therebetween are not limited as long as they do not impair prevention of incorporation of foreign matter, electrolyte injectability and gas discharge.

Preferably, the fine pores provide electric insulation as an inherent function of an insulator, and have high permeability to an electrolyte during injection of electrolyte and a size of 1 μm to 100 μm in order to prevent permeation of foreign matter having a size of 100 μm or more.

In this case, there is no risk of incorporation of foreign matter into the jell-roll during electrolyte injection. Thus, advantageously, it is possible to omit a process of screening and removing foreign matter, to remove a risk of short circuit resulting from incorporation of foreign matter and thus improve productivity.

In a specific embodiment, the fine pores may be spaced from one another over the entire surface of the insulator in order to prevent incorporation of foreign matter having a size of 100 μm or more, and improve injectability of electrolyte and gas discharge.

When an electrolyte is injected into the fine pores formed over the entire surface of the insulator, injection passages may be further branched, injectability is improved, injection time can be reduced, injection speed is constant at a predetermined distance between fine pores, the electrolyte can be uniformly impregnated into the jelly-roll and, as a result, battery properties are advantageously improved.

In addition, the fine pores spaced from one another over the entire surface of the insulator provide passages, enabling discharge of gas generated during electrolyte decomposition. In terms of diffusion of gas, discharge speed may be increased when the gas is discharged through the branched discharge passages.

In the present invention, the expression "the fine pores communicate in a longitudinal direction or in longitudinal and traverse directions" means that the fine pores communicate at least in a vertical direction in the plate-shaped insulator. Accordingly, electrolyte injected into the insulator can move to lower parts of the insulator via the fine pores that communicate at least in a longitudinal direction. As defined above, such fine pores may communicate not only in a longitudinal direction but also in a traverse direction (in a horizontal direction in the plate-shaped insulator).

All fine pores do not necessarily communicate, and 50% or more of fine pores preferably communicate, and 70% or more of fine pores more preferably communicate. It may be understood that these fine pores are a kind of open-type pores.

Such communicated fine pores may be produced by various methods. For example, a chemical or physical foaming agent is added to a melt or solution for forming a material made of polymer resin or polymer composite as a material for the insulator, followed by foaming, or a soluble filler is added to the melt or solution and the filler is then removed, but the method of forming fine pores is not limited thereto.

In a specific embodiment, the communicated fine pores may be formed by treatment of a foaming agent. Examples of the physical foaming agent include butane, pentane or the like used for products such as expended polystyrene (EPS) and EPP. Examples of chemical foaming agents include inorganic foaming agents such as sodium bicarbonate ($NaHCO_3$) and organic foaming agents such as azodicaronamide (ADAC), P,P'-oxybis(benzene sulfonyl hydrazide (OBSH), and p-toluene sulfonyl hydrazine (TSH).

In general, as porosity increases, a density of the insulator decreases and mechanical properties are deteriorated. For this reason, by adding a reinforcing filler to a polymer resin or polymer resin composite, porosity can be maintained and desired mechanical properties can be secured. The reinforcing filler may have a granular or fibrous shape, and the content thereof is not particularly limited. For example, the content of the filler is 0.5 to 20% by weight, preferably 1 to 10% by weight, based on the total weight of the insulator.

The insulator may be made of any insulating material without particular limitation and is for example made of an electrical insulating resin or an electrical insulating polymer composite. Specifically, the polymer resin may be one or more selected from the group consisting of polyethylene (PE), polypropylene (PP), polybutylene (PB), polystyrene (PS), polyethylene terephthalate (PET), natural rubbers and synthetic rubbers.

Also, the insulator has a total thickness of 0.1 mm to 0.5 mm. When the thickness of the insulator is excessively small, the inherent electric insulating function of the insulator may not be sufficiently exerted, and when the thickness thereof is excessively large, disadvantageously, jelly-roll size is decreased and battery capacity is thus decreased in the battery case having the same size.

Preferably, the insulator includes an opening to enable pass-through of the electrode terminals.

Preferably, the secondary battery according to the present invention may be applied to a lithium secondary battery fabricated by impregnating a lithium-containing electrolyte in the jelly-roll.

In general, a lithium secondary battery comprises a cathode, an anode, a separator, a lithium-containing aqueous electrolyte and the like.

For example, the cathode is produced by applying a slurry prepared by mixing a cathode mixture containing a cathode active material and optionally containing a conductive material, a binder, a filler and the like with a solvent such as NMP to a cathode current collector, followed by drying and rolling.

Examples of the cathode active material include, but are not limited to, layered compounds such as lithium cobalt oxide ($LiCoO_2$) or lithium nickel oxide ($LiNiO_2$) or compounds substituted with one or more transition metals; lithium manganese oxides such as $Li_{1+y}Mn_{2-y}O_4$ (in which y is 0 to 0.33), $LiMnO_3$ and $LiMn_2O_3$, and $LiMnO_2$; lithium copper oxides ($Li_2CuO_2$); vanadium oxides such as $LiV_3O_8$, $LiFe_3O_4$, $V_2O_5$, and $Cu_2V_2O_7$; Ni site-type lithium nickel oxides represented by $LiNi_{1-y}M_yO_2$ (in which M=Co, Mn, Al, Cu, Fe, Mg, B or Ga, y=0.01 to 0.3); lithium manganese composite oxides represented by formula of $LiMn_{2-y}M_yO_2$ (in which M=Co, Ni, Fe, Cr, Zn or Ta, y=0.01 to 0.1) or $Li_2Mn_3M_yO_8$ (in which, M=Fe, Co, Ni, Cu or Zn); $LiMn_2O_4$ in which a part of Li is substituted by an alkaline earth metal ion; disulfide compounds; $Fe_2(MoO_4)_3$ and the like.

The cathode current collector is generally manufactured to have a thickness of 3 to 500 μm. Any cathode current collector may be used without particular limitation so long as it has suitable conductivity without causing adverse chemical changes in the manufactured battery. Examples of the cathode current collector include stainless steel, aluminum, nickel, titanium, sintered carbon, and aluminum or stainless steel surface-treated with carbon, nickel, titanium or silver. These current collectors include fine irregularities on the surface thereof so as to enhance adhesion to electrode active materials. In addition, the current collectors may be used in various forms including films, sheets, foils, nets, porous structures, foams and non-woven fabrics.

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include conductive materials including graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

For example, the anode is produced by applying a slurry prepared by mixing an anode mixture containing an anode active material with a solvent such as NMP to an anode current collector, followed by drying and rolling. The anode mixture may further optionally contain the components described above.

Examples of the anode active material include carbon such as hard carbon, graphite-based carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group I, II and III elements, halogen; $0 < x \leq 1$; $1 \leq y \leq 3$; $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials and the like.

The anode current collector is generally fabricated to have a thickness of 3 to 500 μm. Any anode current collector may be used without particular limitation so long as it has suitable conductivity without causing adverse chemical changes in the manufactured battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collectors, the current collectors include fine irregularities on the surface thereof so as to enhance adhesion to electrode active materials. In addition, the current collectors may be used in various forms including films, sheets, foils, nets, porous structures, foams and non-woven fabrics.

Meanwhile, the electrolyte is composed of a non-aqueous electrolyte and a lithium salt. Examples of preferred electrolytes include non-aqueous organic solvents, organic solid electrolytes, inorganic solid electrolytes and the like.

Examples of the non-aqueous solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally contain carbon dioxide gas, fluoro-ethylene carbonate (FEC), propene sultone (PRS) or fluoro-ethylene carbonate (FEC).

The present invention also provides a device comprising the secondary battery as a power source and the device according to the present invention is preferably used for mobile devices such as cellular phones and portable computers as well as electric bikes (E-bikes), electric vehicles (EVs), hybrid electric vehicles (HEVs), plug-in hybrid electric vehicles and power-storage devices in terms of superior lifespan and safety.

The structures and fabrication methods of the lithium secondary battery, and medium and large battery modules and devices including the lithium secondary battery as a unit battery are well-known in the art and a detailed description thereof is thus omitted.

Effects of Invention

As apparent from the fore-going, the secondary battery according to the present invention does not need a process for screening and removing foreign matter and can branch injection passages of electrolyte, thus advantageously greatly improving productivity.

The secondary battery according to the present invention has no risk of short circuit resulting from incorporation of foreign matter and improves gas exhaust, thus enhancing safety.

Also, the secondary battery according to the present invention improves rate characteristics since a jelly-roll is evenly impregnated in an electrolyte.

Also, the secondary battery according to the present invention can maintain porosity and secure a desired mechanical strength, thus improving productivity.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only for illustration of the present invention and should not be construed as limiting the scope and spirit of the present invention.

Figure 4:
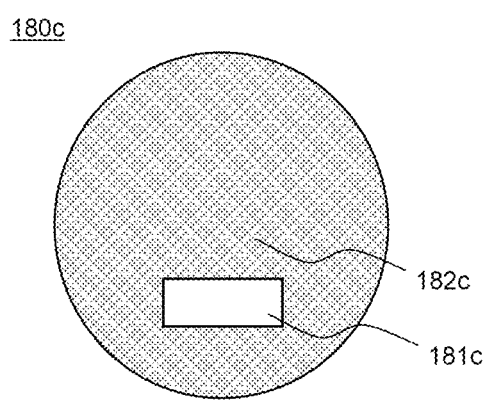
FIG. 4 is a plan view illustrating an insulator according to one embodiment of the present invention.

FIG. 4 is a plan view schematically illustrating an insulator according to one embodiment of the present invention.

Figure 1:
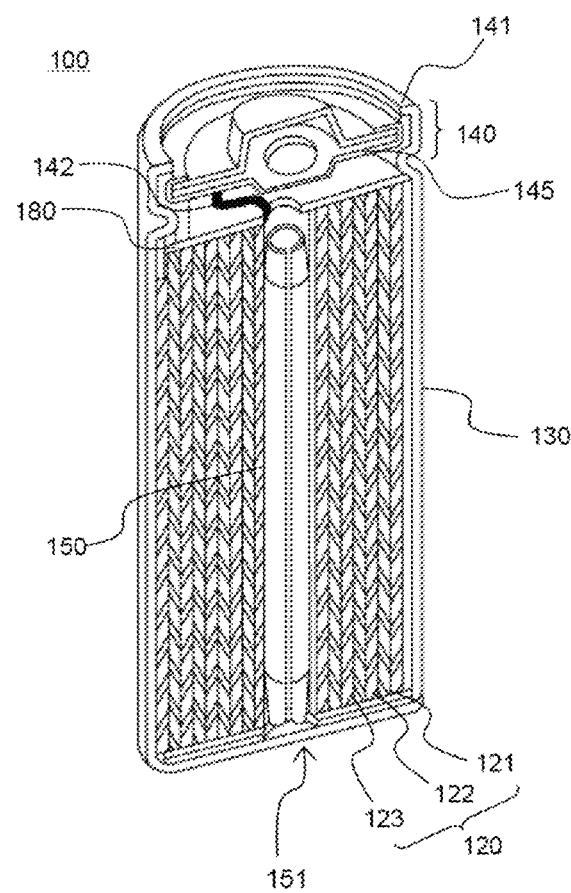
FIG. 1 is a schematic sectional view illustrating a representative cylindrical secondary battery.

Referring to FIGS. 4 and 1, a secondary battery 100 has a structure in which a jelly-roll 120 having a cathode 121/separator 123/anode 122 structure is mounted in a cylindrical battery case 130, wherein an insulator 180c is mounted on top of the jelly-roll 120.

The insulator 180c comprises polyethylene terephthalate (PET) with a thickness of about 0.4 mm, is provided at one side thereof with an opening 181c and is provided over the entire surface thereof with a plurality of fine pores 182c having a diameter of 10 to 30 μm spaced from one another by a predetermined distance.

Accordingly, an electrolyte permeates through the plurality of fine pores 182c into the entire surface of the insulator 180c after being injected, thus causing considerable improvement in injectability and preventing short circuit.

Now, the present invention will be described in more detail with reference to the following examples. These examples are provided only to illustrate the present invention and should not be construed as limiting the scope and spirit of the present invention.

Example 1

An insulator having a thickness of 0.4 mm, including a rectangular opening with a width of 6 mm and a length of 2.5 mm perforated in one side thereof and including a plurality of fine pores having a diameter of about 10 μm to 30 μm uniformly distributed by a predetermined distance of about 10 μm to 30 μm over the entire surface thereof was manufactured using PET as a material and ADAC as a foaming agent, as shown in FIG. 4. Then, the insulator was mounted on top of a jelly-roll in which a cathode/separator/anode structure is rolled based on a center pin and a cylindrical secondary battery of 18650 standard (diameter 18 mm, length 65 mm) was manufactured in a state that fine metal powders generated in the process of battery assembly were positioned on the insulator.

Example 2

An insulator and a secondary battery were manufactured in the same manner as in Example 1 except that an insulator including a plurality of fine pores having a diameter of 100 μm uniformly distributed by a predetermined distance of about 120 μm over the entire surface thereof was prepared.

Comparative Example 1

Figure 2:
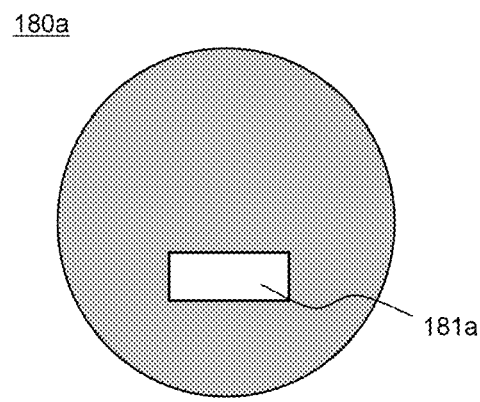
FIG. 2 is a plan view illustrating an insulator used for the secondary battery of FIG. 1 according to one embodiment.

An insulator and a secondary battery were manufactured in the same manner as in Example 1 except that a plurality of fine pores were not included, as shown in FIG. 2.

Comparative Example 2

Figure 3:
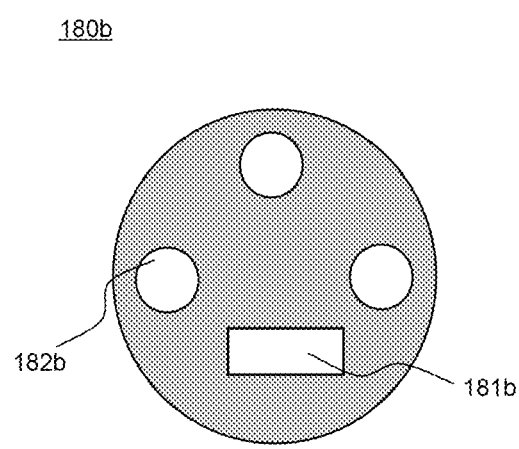
FIG. 3 is a plan view illustrating an insulator used for the secondary battery of FIG. 1 according to another embodiment.

An insulator and a secondary battery were manufactured in the same manner as in Example 1 except that three through holes having a diameter of 2.5 mm were formed, instead of the fine pores, as shown in FIG. 3.

Comparative Example 3

An insulator and secondary battery were manufactured in the same manner as in Example 1 except that an insulator including a plurality of fine pores having a diameter of 150 μm uniformly distributed by a predetermined distance of about 120 μm over the entire surface thereof was prepared.

Test Example 1

The secondary batteries fabricated in Examples 1 and 2 and Comparative Examples 1 to 3 were subjected to electrolyte impregnation testing. The results are shown in Table 1 below. Electrolyte impregnation testing was carried out by injecting a 1M $LiPF_6$ carbonate electrolyte into the manufactured cylindrical battery case, measuring a time taken until impregnation ratio of the jelly-roll reached 100%, repeating this process four times and calculating an average of the four values.

In addition, a cap assembly was welded to the open top of the fabricated secondary battery to produce 10 samples. The samples were subjected to charge and discharge testing and generation of short circuit was confirmed. Results are shown in Table 1 below.

TABLE 1

|  | Impregnation time (sec) | Time shortage ratio (%) (based on Comp. Ex. 1) | Number of short-circuited batteries (n) | Short circuit ratio (%) |
| --- | --- | --- | --- | --- |
| Ex. 1 | 335 | 56 | 0 | 0 |
| Ex. 2 | 329 | 55 | 0 | 0 |
| Comp. Ex. 1 | 698 | 0 | 2 | 20 |
| Comp. Ex. 2 | 538 | 23 | 4 | 40 |
| Comp. Ex. 3 | 301 | 57 | 1 | 10 |

As can be seen from Table 1, the batteries of Examples 1 to 2 according to the present invention had considerably shortened electrolyte impregnation time, as compared to Comparative Example 1. That is, it could be seen that the electrolyte was effectively permeated through a plurality of fine pores formed in the insulator.

The battery of Comparative Example 2 exhibited improved impregnation, but increased short circuit, as compared to the battery of Comparative Example 1, while the battery of Comparative Example 3 also exhibited impregnation comparable to Examples 1 and 2, but exhibited higher short circuit rate. The reason for this was found to be that metal powders were permeated into relatively large pores, causing short circuit in the jelly-roll.

On the other hand, the battery of Comparative Example 1 exhibited high short circuit rates as compared to the batteries of Examples 1 and 2, although fine pores were not perforated in the insulator mounted on the battery. The reason for the high short circuit rate was believed to be due to the fact that, in the batteries of Examples 1 and 2, movement of metal powders was suppressed when metal powders were entrapped in the fine pores, while, in the battery of Comparative Example 1, metal powders freely moved on the smooth surface of the insulator and thus moved to the jelly-roll through the circumference of the opening or insulator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery having a structure in which a jelly-roll having a cathode/separator/anode structure is mounted in a cylindrical battery case and a plate-shaped insulator is mounted on top of the jelly-roll,
wherein the insulator has a porous structure in which a plurality of pores communicate in a longitudinal direction, or in traverse and longitudinal directions, and further comprises a reinforcing filler to improve mechanical strength, and
wherein the reinforcing filler has a granular or fibrous shape.

2. The secondary battery according to claim 1, wherein the pores are formed over the entire surface of the insulator.

3. The secondary battery according to claim 1, wherein the insulator comprises an electrical insulating polymer resin or an electrical insulating polymer composite.

4. The secondary battery according to claim 3, wherein the polymer resin is at least one selected from the group consisting of polyethylene (PE), polypropylene (PP), polybutylene (PB), polystyrene (PS), polyethylene terephthalate (PET), natural rubbers and synthetic rubbers.

5. The secondary battery according to claim 1, wherein the insulator has a thickness of 0.1 mm to 0.5 mm.

6. The secondary battery according to claim 1, wherein the insulator comprises an opening to enable pass-through of electrode terminals.

7. The secondary battery according to claim 1, wherein the battery is a lithium secondary battery.

8. A device comprising the secondary battery according to claim 1 as a power source.

9. The device according to claim 8, wherein the device is selected from a cellular phone, a portable computer, an electric bike (E-bike), an electric vehicle, a hybrid electric vehicle, a plug-in hybrid electric vehicle and a power-storage device.

10. The secondary battery according to claim 1, wherein the pores have a size of 1 μm to 100 μm.

* * * * *